United States Patent [19]

Tsubusaki et al.

[11] 4,275,103

[45] Jun. 23, 1981

[54] ELECTROGRAPHIC RECORDING MEDIUM WITH CONDUCTIVE LAYER CONTAINING METAL OXIDE SEMICONDUCTOR

[75] Inventors: Shigeru Tsubusaki; Nobuo Sonoda; Wataru Shimotsuma, all of Kadoma, Japan

[73] Assignee: Matsushita Electric Industrial Co., Ltd., Kadoma, Japan

[21] Appl. No.: 54,901

[22] Filed: Jul. 5, 1979

[30] Foreign Application Priority Data

| | | | |
|---|---|---|---|
| Jul. 12, 1978 | [JP] | Japan | 53-85590 |
| Jul. 31, 1978 | [JP] | Japan | 53-94058 |

[51] Int. Cl.[3] .......... B32B 3/00; B32B 21/06

[52] U.S. Cl. .......... 428/148; 428/142; 428/144; 428/403; 428/411; 428/537; 428/913; 428/697; 430/67

[58] Field of Search .......... 428/537, 913, 403, 539, 428/411, 142, 144, 148, 328, 409; 430/90, 95, 417

[56] References Cited

U.S. PATENT DOCUMENTS

| | | | |
|---|---|---|---|
| 3,479,215 | 11/1969 | Cavagna | 428/537 |
| 3,640,766 | 2/1972 | Jursich | 428/537 |
| 3,823,034 | 7/1974 | Higaki | 428/537 |
| 3,956,571 | 5/1976 | Takao | 428/537 |
| 3,969,283 | 7/1976 | Timmerman | 428/537 |
| 3,991,256 | 11/1976 | Cornier | 428/537 |
| 3,998,987 | 12/1976 | Kirigaya | 428/537 |
| 4,024,311 | 5/1977 | MacDonald | 428/537 |
| 4,139,675 | 2/1979 | Nagai | 428/913 |
| 4,173,677 | 11/1979 | Nakano | 428/913 |

*Primary Examiner*—Ellis P. Robinson
*Attorney, Agent, or Firm*—Lowe, King, Price & Becker

[57] ABSTRACT

An electrographic recording medium comprising a conductive layer coated on a support such as of paper and overcoated with a dielectric layer. The conductive layer contains fine particles of an n-type metal oxide semiconductor, preferably a whitish or lightly colored one such as $SnO_2$, $In_2O_3$ or ZnO, dispersed in a binder which may be either a nonconductive polymer or a polyelectrolyte. This recording medium is excellent in recording characteristics and particularly advantageous in its usefullness over a wide humidity range containing very low relative humidities.

14 Claims, No Drawings

ELECTROGRAPHIC RECORDING MEDIUM WITH CONDUCTIVE LAYER CONTAINING METAL OXIDE SEMICONDUCTOR

BACKGROUND OF THE INVENTION

This invention relates to an electrographic recording medium of the type having a double-layer coating consisting of a dielectric layer and a conductive layer on the surface of a support for use in facsimile or high speed printing by way of example.

One type of known electrographic recording media comprise a conductive layer which is formed on a surface of a support such as a paper sheet or a plastic film and has a surface resistivity of $10^5$–$10^{11}$ ohms and a dielectric layer coated on the conductive layer and made of a highly dielectric material whose resistivity (specific resistance) is above $10^{12}$ Ωcm.

Formerly, the conductive layer was formed usually by impregnating a support such as of slick paper with a solution of an inorganc electrolyte material such as lithium chloride or by coating a surface of a support with either a cationic polyelectrolyte such as a high molecular quaternary ammonium salt or an anionic polyelectrolyte such as a high molecular sulfonate. However, a conductive layer of this category, i.e. one utilizing ionic conduction in an electrolyte, has a serious drawback that the surface resistivity of this layer is greatly influenced by the humidity in the environmental atmosphere and, particularly, undergoes a drastic increase where the himidity in terms of relative humidity is below about 20%, so that recording becomes almost impossible in very low humidity atmospheres. The reason for such a drastic increase in the surface resistivity in a very low humidity atmosphere is that the conductive layer is deprived of moisture indispensable to ionic conduction.

To obviate this drawback of the conductive layer utilizing ionic conduction in an electrolyte, it has been proposed to utilize a metal iodide such as cuprous iodide or silver iodide, which is an electronically conductive substance, as an essential material of the conductive layer in an electrographic recording medium of the aforementioned type in, for example, U.S. Pat. No. 3,245,833 and Japanese Patent Application Publication (primary) Nos. 48(1973)-30936 and 50(1975)-159339. Since the surface resistivity of an electronically conductive layer of the proposed type is not significantly influenced by the humidity in the environmental atmosphere, recording becomes possible even at very low humidities. However, it is inevitable that the use of either cuprous iodide or silver iodide gives an unwantedly colored recording medium. Besides, such an iodide is thermally unstable since its electronic conductivity originates in the excess of iodine, so that a recording medium utilizing either cuprous iodide or silver iodide tends to liberate iodine, an ill-smelling vapor, during thermal fixing of toner-developed images.

SUMMARY OF THE INVENTION

It is an object of the present invention to provide an improved electrographic recording medium of the type having a conductive layer coated on the surface of a support and overcoated with a dielectric layer, which recording medium can be used over a wide humidity range containing very low and very high humidities and is excellent in thermal stability.

It is another object of the invention to provide an electrographic recording medium of the above stated type, which recording medium exhibits an improved resolving power and can give visible images of higher photographic density compared with conventional recording media.

It is a still another object of the invention to provide an electrographic recording paper of the above stated type, which recording paper has improved properties as stated above and, besides, is high in whiteness and bears a close resemblance in appearance to plain paper.

An electrographic recording medium according to the invention comprises a support such as of paper or plastic film, a conductive layer coated on a surface of the support and a dielectric layer formed on the outer surface of the conductive layer. As the principal feature of the invention, the conductive layer of this recording medium is formed of a dispersion of fine particles of an electronically conductive n-type metal oxide semiconductor in an organic binder.

Owing to the use of an electronically conductive n-type metal oxide semiconductor powder as a conductive component of the conductive layer, this recording medium is exceedingly low in susceptibility to the humidity in the environmental atmosphere and, besides, has improved photographic characteristics particularly in regard of photographic density of the produced images and resolving power.

Many kinds of electronically conductive metal oxide semiconductors are known. Since they are commonly stable both thermally and chemically, an optional selection of one among these known metal oxide semiconductors can be made to produce the conductive layer according to the invention. However, it is preferable to use an almost colorless, whitish or only lightly colored metal oxide semiconductor particularly in the case of the recording medium being a recording paper (that is, in the case of the support being a paper sheet) which is usually desired to be high in whiteness and seemingly indistinguishable from plain paper. More definitely, tin dioxide, diindium trioxide and zinc oxide are the most preferable metal oxides in the present invention.

The resistivity of an n-type metal oxide semiconductor powder selected as a material for the conductive layer according to the invention can be further lowered by treating the powder with a solution of either a stannous halide or an antimony trihalide preferably in advance of mixing of the metal oxide powder and a binder material. Such treatment of n-type metal oxide semiconductors is disclosed in U.S. patent application Ser. No. 958,498 filed Nov. 7, 1978 and British Patent Application No. 43649/78 filed Nov. 8, 1978. The employment of this treatment is very preferable in the present invention because a resultant lowering in the resistivity of the metal oxide semiconductor powder makes it possible to decrease the weight per area of the conductive coating. Besides, a very low resistivity metal oxide powder obtained through this treatment is exceedingly whitish, so that the recording medium bears further improved whiteness and, in the case of a recording paper, a close resemblance to plain paper.

The film-forming binder for the conductive layer may be an insulating polymer. However, the use of a polyelectrolyte as the binder is more advantageous because, then, both recording characteristics and humidity unsusceptibility of the recording medium can be further improved by cooperative effects of the electronic conductivity of the metal oxide powder and the ionic conductivity of the polyelectrolyte. It becomes possible to obtain a recording medium which can produce electrographic images very clear, stable and high in photographic density over a very wide humidity range such as about 2–95% R.H. If desired, a nonconductive polymer and a polyelectrolyte may be used jointly.

DESCRIPTION OF THE PREFERRED EMBODIMENTS

Typical examples of nonconductive polymers useful as a film-forming binder material for the conductive layer according to the invention are polyvinyl alcohol, a copolymer of styrene and butadiene (i.e. SBR latex) and a hydroxyethyl cellulose. The conductive layer can be made by applying a conductive paint prepared by dispersing an n-type metal oxide semiconductor powder in a solution of a selected film-forming binder material onto a surface of the support, followed by drying.

As to a binder having ionic conductivity, it is possible to utilize a composite material obtained by dissolving or impregnating an inorganic electrolyte such as lithium chloride in a nonconductive polymer such as polyvinyl alcohol. However, it is far more preferable to utilize a polymeric electrolyte of high molecular weight that has a binding ability. Both cationic polyelectrolytes and anionic polyelectrolytes are of use in the present invention. A typical example of cationic polyelectrolytes is a polymeric quaternary ammonium salt such as polyvinyl benzyltrimethyl ammonium chloride. Preferred examples of anionic polyelectrolytes are polymeric sulfonate such as polystyrene ammonium sulfonate, ammonium or sodium salt of styrene-maleic anhydride copolymer and ammonium or sodium salt of isobutylenemaleic anhydride copolymer. However, when the metal oxide semiconductor powder is treated with a stannous halide or an antimony trihalide by adding the halide to a dispersion of the metal oxide powder in a binder solution, the use of a cationic polyelectrolyte is undesirable because in such a case the halide present in the dispersion tends to cause gelation of the polyelectrolyte binder, offering considerable difficulty to the preparation of a useful paint. Even in this case, the use of an anionic polyelectrolyte offers no problem. As mentioned above, the binder for the conductive layer may be a combination of a polyelectrolyte and a nonconductive polymer such as polyvinyl alcohol, poly(styrene-butadiene) or hydroxyethyl cellulose.

It is preferable to use an n-type metal oxide semiconductor powder having a mean particle size in the range from about 0.5 microns to about 10 microns. Also preferably, the conductive layer is made to contain about 10–50 parts by weight of organic binder to 100 parts by weight of n-type metal oxide semiconductor powder.

The aforementioned metal halide treatment of an n-type metal semiconductor powder is performed preferably by the following process. The metal oxide powder is immersed in an aqueous solution of a stannous halide such as stannous fluoride or an antimony trihalide such as antimony trichloride at room temperature, followed by stirring for a few minutes. The amount of the metal halide in the solution is made to range from 0.1 to 10 mol% of the metal oxide semiconductor powder subjected to treatment. Then the metal oxide powder is separated from the solution by filtration and thereafter dried at a relatively low temperature, e.g. at 50°–70° C., to evaporate moisture.

The conductive layer may optionally comprise a white pigment such as talc, calcium carbonate or titanium dioxide as a whiteness-improving filler.

The material for the dielectric layer in a recording medium according to the invention can optionally be selected among various dielectric polymers conventionally used for electrographic recording media. Typical examples are polyesters and vinyl chloride-vinyl acetate copolymers. The dielectric layer may optionally contain a white pigment as filler, too.

The invention will be illustrated by the following examples.

EXAMPLE 1

Three kinds of electronically conductive metal oxide semiconductors, namely, tin dioxide, diindium trioxide and zinc oxide, were prepared in powder form and tested in this example. First, a low resistivity tin dioxide powder was prepared by doping a reagent grade $SnO_2$ powder with diantimony pentoxide in a concentration of 0.3 mol% by the employment of a conventional doping technique. Similarly, a low resistivity diindium trioxide powder was prepared from a reagent grade $In_2O_3$ powder by 10 mol% tin dioxide doping and a low resistivity zinc oxide powder from a reagent grade ZnO powder by 0.5 mol% aluminum oxide doping.

For each of the thus prepared semiconductive metal oxide powders, resistivity (specific resistance) $\rho$ was measured by putting 0.6 g of sample powder into an insulating and cylindrical tube having an inner diameter of 6 mm and compressing the sample powder at a pressure of 70 kg/cm$^2$ with cylindrical platinum electrodes fitted into the tube from both sides of the sample. The results are presented in Table 1.

The semiconductive tin dioxide powder was mixed with an aqueous dispersion medium containing polyvinyl alcohol (PVA) as a binder and ground in a ball mill to give a homogenized dispersion which served as a conductive paint. Similarly a conductive paint containing the semiconductive diindium trioxide powder was prepared by using hydroxyl ether cellulose (HEC) as a binder in place of PVA, and a conductive paint containing the zinc oxide powder by using a styrene-butadiene copolymer latex (SBR) as a binder. In each of these conductive paints, the amount of the binder was 20 parts by weight to 100 parts by weight of the metal oxide powder.

Each of these three kinds of conductive paints was applied onto a surface of slick paper by means of wire bar, followed by drying, to make a conductive coating layer on the paper surface. Microscopic observation revealed that the surface of the conductive layer was not really smooth but was formed with innumerable rises and dents each a few microns in height or depth. Surface resistivities $\rho_s$ of the three kinds of conductive coatings measured at 20° C., 65% R.H. are presented in Table 1.

TABLE 1

| N-type Metal Oxide Semiconductor Powder | | | Conductive Coating | | |
|---|---|---|---|---|---|
| Metal Oxide | Color | Resistivity $\rho$ ($\Omega$cm) | Binder | Weight per Area (g/m$^2$) | Surface Resistivity $\rho_s$ ($\Omega$) |
| $SnO_2$ | light blue | $8.3 \times 10$ | PVA | 14.3 | $4.6 \times 10^7$ |
| $In_2O_3$ | light yellow | $6.3 \times 10$ | HEC | 11.0 | $8.5 \times 10^6$ |
| ZnO | light | $8.7 \times 10^2$ | SBR | 18.6 | $1.2 \times 10^8$ |

TABLE 1-continued

| N-type Metal Oxide Semiconductor Powder | | | Conductive Coating | | |
|---|---|---|---|---|---|
| Metal Oxide | Color | Resistivity $\rho$ ($\Omega$cm) | Binder | Weight per Area (g/m²) | Surface Resistivity $\rho_s$ ($\Omega$) |
| | blue | | | | |

Although the tested metal oxide powders were different in resistivity $\rho$, it was possible to obtain a conductive coating having a surface resistivity $\rho_s$ of a desired level from any one of these metal oxide powderes by controlling the weight per unit area of the metal oxide powder applied to the paper surface. However, it is desirable to use a metal oxide semiconductor powder having a resistivity $\rho$ below $10^4$ $\Omega$cm because the use of a metal oxide powder higher in resistivity (as the result of insufficient doping) makes it necessary to apply such a large quantity of the powder (in the form of conductive paint) onto the paper surface to obtain a conductive coating having a desired surface resistivity $\rho_s$ that the coating process becomes unsuitable to practical applications.

Electrographic recording papers were obtained by making a dielectric layer on the respective conductive coatings. More particularly, a dielectric paint prepared by dissolving 100 parts by weight of a linear polyester in a mixture of 100 parts by weight of dichloroethane and 300 parts by weight of chlorobenzene was applied onto the surface of each conductive layer by means of wire bar, followed by drying. The weight per area of the dielectric layer after drying was 5–7 g/m². The thus prepared three kinds of electrographic recording papers exhibited reflex density values of 0.13–0.14 (measured by Macbeth densitometer) and, favorably, looked like uncoated or plain paper though slighty tinged with the color of the respective metal oxide powders.

These recording papers were subjected to a usual electrographic recording test which was carried out under a 20° C., 65% R.H. condition, and it was confirmed that all the samples could give visual images of high photographic density with excellent resolving power and without the occurrence of fogging or blocking. These recording papers were judged to be superior, particularly in resolving power, to conventional recording papers having a conductive layer which exhibits only ionic conductivity.

As mentioned above, a conductive layer according to the invention has a microscopically rugged surface formed with innumerable rises and dents. This causes the dielectric layer formed on the conductive layer to become nonuniform in thickness. The microscopical rises or protuberances of the conductive layer are attributed to the fine particles of the electronically conductive metal oxide dispersed in this layer and intrude into the dielectric layer. Such an interfacial structure given by the electronically conductive metal oxide particles is considered to make an important contribution to the improved recording characteristics of a recording medium according to the invention.

Japanese Patent Application Publication No. 43(1968)-21785 shows an electrographic recording medium comprising an ionically conductive layer which is principally formed of a resin impregnated with lithium chloride and additionally contains fine particles of a nonconductive material such as alumina dispersed in the resin matrix to afford a microscopically rugged surface to this layer such that, when a dielectric layer is formed on this conductive layer, the protuberances on the surface of the conductive layer intrude into the dielectric layer to depths greater than 5 microns. Thus, there is a resemblance between the interfacial structure of this Japanese Patent Application and that of the present application. These two applications have a common thought that, when a recording signal voltage applied to the recording medium, an intensified electric field will be produced in the thin regions of the dielectric layer resulting from intrusion of the microscopic protuberances of the conductive layer. In the recording medium of the Japanese patent application, however, the expected effect of the local thickness reduction of the dielectric layer will be cancelled, if not entirely, by the non-conductivity of the solid particles which give the protuberances of the conductive layer. In contrast, the protuberances of the conductive layer according to the invention are formed of electronically conductive metal oxide particles, so that intensification of electric field in the thin regions of the dielectric layer can be realized to a far larger extent. This is considered to be a primary reason for the improved photographic density of images recorded on the recording papers of Example 1.

The improvement in the resolving power is also considered to be produced by the above described interfacial structure in the present invention: the nonuniformity in thickness of the dielectric layer due to the ruggedness of the conductive layer surface will cause a significantly nonuniform distribution of the charges of the electrostatic latent images as well as a considerable enlargement of the difference between the highest and lowest electric field intensities.

In the present invention, the rises and dents on the surface of the conductive layer need not to be greater than 5 microns in height or depth. Because of the existence of a great difference in volume resistivity between the binder and the electronically conductive metal oxide particles in this conductive layer ($\rho < 10^4$ $\Omega$cm for metal oxides used in this invention, and $\rho > 10^{10}$ $\Omega$cm for binders), the surface resistivity $\rho_s$ of the conductive layer in microscopic view exhibits such nonunifomity in its surface resistivity $\rho_s$ as produces an appreciable improvement in the resolving power of the recording medium even when the surface ruggedness of the conductive layer is of the order of only 2–3 microns. In fact, microscopic observation of the sectional structure of the recording papers produced in Example 1 revealed that the rises and dents on the surface of the conductive layer of every sample were only 2–3 microns in height or depth. Also it was revealed that the rises were formed of the metal oxide particles while the dented regions were consitituted almost soley of the binder. Such difference in material (hence in conductivity) between the risen and dented regions makes an additional contribution to augmenting irregularities of the surface resistivity $\rho_s$ of the conductive layer viewed microscopically.

The photographic characteristics of the electrographic recording papers produced in Example 1 were measured at various relative humidities. As the result, satisfactory visual images could be produced on all the samples over the humidity range from 2% R.H. to 95% R.H. though there was a tendency of slight lowering in photographic density of the images at high humidities. On conventional electrographic recording papers utilizing ion conduction, recording was utterly impossible at humidities below 20% R.H.

It is natural that the recording papers of Example 1 did not emit any corrosive vapor during thermal fixing of the developed images since they did not utilize any iodide but utilized metal oxides which are exceedingly high in thermal stability.

EXAMPLE 2

A low resistivity tin dioxide powder was prepared by doping a reagent grade $SnO_2$ powder with diantimony pentoxide in a concentration of 0.2 mol% by the employment of a conventional doping technique. Similarly, a low resistivity diindium trioxide powder was prepared from a reagent grade $In_2O_3$ powder by 5 mol% tin dioxide doping and a low resistivity zinc oxide from a reagent grade ZnO powder by 0.3 mol% aluminum oxide doping. The resistivities $\rho$ of the thus prepared metal oxide semiconductor powders (measured by the method described in Example 1) are presented in the following Table 2.

The semiconductive tin dioxide powder was mixed with a solution of polystyrene ammonium sulfonate (AEP-1 of ARAKAWA CHEMICAL) and ground in a ball mill to obtain a homogenized dispersion which served as a conductive paint. Similarly a conductive paint was prepared by dispersing the semiconductive zinc oxide powder in the solution of AEP-1, and another conductive paint was prepared by dispersing the diindium trioxide powder in a solution of polyvinyl benzyltrimethyl ammonium chloride (ECR of DOW CHEMICAL). In each of these conductive paints, the amount of the binder (polyelectrolyte) was 20 parts by weight to 100 parts by weight of the metal oxide powder.

Each of these three kinds of conductive paints was coated on a slick paper sheet by means of wire bar, followed by drying, to make a conductive layer on the paper surface. Surface resistivities $\rho_s$ of the resultant three kinds of conductive coatings measured at 20° C., 65% R.H. are presented in Table 2.

TABLE 2

| N-type Metal Oxide Semiconductor Powder | | | Conductive Coating | | |
|---|---|---|---|---|---|
| Metal Oxide | Color | Resistivity $\rho$ ($\Omega$cm) | Binder | Weight per Area (g/m²) | Surface Resistivity $\rho_s$ ($\Omega$) |
| $SnO_2$ | light blue | $2.4 \times 10^2$ | AEP-1 | 11.0 | $2.3 \times 10^7$ |
| $In_2O_3$ | light yellow | $8.5 \times 10$ | ECR | 7.0 | $6.5 \times 10^6$ |
| ZnO | light blue | $1.4 \times 10^3$ | AEP-1 | 15.6 | $8.5 \times 10^7$ |

Next, each of these conductive layers was overcoated with a dielectric paint prepared by dissolving 100 parts by weight of a vinyl chloride-vinyl acetate copolymer in 300 parts by weight of methylethyl ketone and dispensing 100 parts by weight of powdered calcium carbonate, followed by drying. The weight per area of the resultant dielectric layer was 5–7 g/m².

The three kinds of recording papers thus produced were higher in whiteness (exhibited reflex density values of 0.12–0.13) and had a closer resemblance to plain paper than those produced in Example 1. Such improvement was derived from the reduction in weight per area of each conductive layer made possible by the use of a polyelectrolyte, a low resistivity material, as the binder. Furthermore, the recording papers of Example 2 were extremely unsusceptible to humidity. Over the humidity range of 2–95% R.H., these recording papers could produce very clear and very stable images.

EXAMPLE 3

Generally similarly to Examples 1 and 2, three kinds of n-type metal oxide semiconductor powders were prepared except that the amount of the dopant for each metal oxide was decreased to the following values: 0.1 mol% $Sb_2O_5$ for $SnO_2$, 1 mol% $SnO_2$ for $In_2O_3$ and 0.2 mol% $Al_2O_3$ for ZnO.

Each of these semiconductive metal oxide powders was immersed at room temperature in an aqueous solution of stannous fluoride amounting to 1 mol% of the immersed metal oxide powder, followed by a few minutes of stirring. Then the semiconductive metal oxide powder was separated from the solution by filtration and thereafter dried for 2 hr in air at 60° C. The thus treated metal oxide powders were distinctly high in whiteness than the semiconductive metal oxide powders prepared in Examples 1 and 2 because of the reduced amounts of the dopants in this example. Nevertheless, as shown in Table 3, each of the semiconductive metal oxide powders treated with stannous fluoride had a far lower resistivity $\rho$ than the corresponding metal oxide powders in Examples 1 and 2. It was confirmed that antimony trihalides and stannous halides other than stannous fluoride, too, are almost similarly effective for lowering the resistivity of semiconductive tin dioxide, diindium trioxide or zinc oxide powder.

Using the low resistivity metal oxide powders obtained through the stannous fluoride treatment, three kinds of conductive paints were prepared in accordance with Example 1 (the weight ratio of the metal oxide to the binder was 100:20), and each paint was applied onto a slick paper sheet by means of wire bar, followed by drying. Surface resistivities $\rho_s$ of the resultant conductive coatings measured at 20° C., 65% (R.H.) are also presented in Table 3.

TABLE 3

| N-type Metal Oxide Semiconductor Powder | | | Conductive Coating | | |
|---|---|---|---|---|---|
| Metal Oxide | Color | Resistivity $\rho$ ($\Omega$cm) | Binder | Weight per Area (g/m²) | Surface Resistivity $\rho_s$ ($\Omega$) |
| $SnO_2$ | light blue | $3.8 \times 10^{-1}$ | PVA | 7.3 | $2.1 \times 10^7$ |
| $In_2O_3$ | light yellow | $1.3 \times 10^{-1}$ | HEC | 6.5 | $7.6 \times 10^6$ |
| ZnO | light blue | $3.4 \times 10$ | SBR | 9.8 | $8.3 \times 10^7$ |

Next, each of these conductive layers was overcoated with the dielectric paint used in Example 1 in exact accordance with Example 1, followed by drying.

The three kinds of electrographic recording papers thus produced exhibited reflex density values of 0.11–0.12 and were distinctly higher in whiteness than those produced in Example 1. Besides, in this example the weight per area of the conductive layer necessary to obtain a surface resistivity $\rho_s$ of about $10^7$ was roughly half of the weight needed in Example 1 as can be understood from the data in Tables 1 and 3. As the result, the recording papers of Example 3 were excellent in resemblance to plain paper not only in appearance but also in thickness and touch. As to the recording characteristics, the recording papers produced in Example 3 could produce clear images over the humidity range of 2–95% R.H. with practically unvaried photographic density.

EXAMPLE 4

This example was generally similar to Example 3 except that the nonconductive binders in Example 3 were replaced by polyelectrolytes used in Example 2.

Table 4 shows the resistivities of the semiconductive metal oxide powders used in this example (and also in Example 3) and the properties of the conductive layers obtained in this example. In each conductive layer the weight ratio of the binder (polyelectrolyte) to the metal oxide powder was 20:100. The surface resistivity was measured at 20° C., 65% R.H.

TABLE 4

| N-type Metal Oxide Semiconductor Powder | | | Conductive Coating | | |
|---|---|---|---|---|---|
| Metal Oxide | Color | Resistivity $\rho$ (Ωcm) | Binder | Weight per Area (g/m²) | Surface Resistivity $\rho_s$ (Ω) |
| $SnO_2$ | light blue | $3.8 \times 10^{-1}$ | AEP-1 | 5.6 | $4.5 \times 10^7$ |
| $In_2O_3$ | light yellow | $1.3 \times 10^{-1}$ | ECR | 4.8 | $9.8 \times 10^6$ |
| ZnO | light blue | $3.4 \times 10$ | AEP-1 | 7.6 | $1.3 \times 10^8$ |

Electrographic recording papers were obtained by forming a dielectric layer on each of these three kinds of conductive layers in accordance with Example 2. These recording papers were comparable with those produced in Example 2 in recording characteristics including the unsusceptibility to humidity and were better in naturalness or resemblance to plain paper. Thus, this example demonstrates cooperative effects of the electronic conductivity of an n-type metal oxide semiconductor and the ionic conductivity of a polyelectrolyte (in this case an anionic polyelectrolyte).

The stannous fluoride treatment of the semiconductive metal oxide powders in Examples 3 and 4 was performed by immersion of each metal oxide powder in an aqueous solution of stannous fluoride in advance of the mixing of the metal oxide powder and a binder. Although this method is preferable, it was confirmed that a similarly low resistivity conductive coating can be made also when the treatment is accomplished simultaneously with dispersion of the semiconductive metal oxide powder in a binder solution by adding stannous fluoride (or a different stannous halide or an antimony trihalide) to the solution prior to a grinding-mixing process.

EXAMPLE 5

As demonstrated by Example 3, the use of a very low resistivity n-type metal oxide semiconductor powder obtained through treatment with a stannous halide or an antimony trihalide has an important merit that the weight per area of the conductive layer can be reduced considerably. Besides, the eminent lowness in the resistivity of the treated metal oxide semiconductor powder makes it practicable to add a relatively large amount of a whiteness-improving filler such as talc, calcium carbonate or titanium dioxide to the composition of the conductive layer.

In this example, 100 parts by weight of the tin dioxide powder of Example 3 (having a resistivity of $3.8 \times 10^{-1}$ Ωcm) and 20 parts by weight of powdered calcium carbonate were dispersed in an aqueous solution of 20 parts by weight of polystyrene ammonium sulfonate (AEP-1) by a grinding-mixing process in a ball mill. A resultant conductive paint was coated on a slick paper sheet, followed by drying, so as to give a conductive layer of which weight per area was 7.3 g/m². The surface resistivity $\rho_s$ of this layer at 20° C., 65% R.H. was $3.6 \times 10^7$ ohms.

An electrographic recording paper obtained by overcoating this conductive layer with a dielectric layer according to Example 1 was comparable with the recording papers produced in the foregoing examples in excellence of recording characteristics over the humidity range of 2–95% R.H., and the reflex density of this recording paper was measured to be 0.10, meaning that this recording paper was exceedingly high in whiteness.

Of course, the addition of a whiteness-improving filler to a dispersion of either diindium trioxide or zinc oxide is also permissible and is similarly effective.

What is claimed is:

1. An electrographic recording medium comprising:
a paper or plastic support; and
a conductive layer and a dielectric layer formed on said support in this order, said conductive layer comprising a dispersion of fine particles of at least one n-type metal oxide semiconductor selected from the group consisting of $SnO_2$, $In_2O_3$ and ZnO and whose resistivity is in the range of below $10^4$ Ω·cm when compressed under a pressure of 70 kg/cm², in an organic binder comprising a polymeric electrolyte of high molecular weight, or a mixture of the polymeric electrolyte with a non-conductive polymer, the surface resistivity of said conductive layer being in the range of from $10^6$ Ω to $10^8$ Ω under conditions of a relative humidity of about 65% and room temperature.

2. A recording medium according to claim 1, wherein said organic binder is the polymeric electrolyte of high molecular weight.

3. A recording medium according to claim 1, wherein said organic binder is a mixture of a polymeric electrolyte of high molecular weight and a non-conductive polymer.

4. A recording medium according to claims 2 or 3, wherein said polymeric electrolyte is a cationic polymeric electrolyte.

5. A recording medium according to claim 4, wherein said cationic polymeric electrolyte is a polymeric quaternary ammonium salt.

6. A recording medium according to claims 2 or 3, wherein said polymeric electrolyte is an anionic polymeric electrolyte.

7. A recording medium according to claim 6, wherein said anionic polymeric electrolyte is a polymeric sulfonate.

8. A recording medium according to claim 1, wherein said organic binder is present in an amount of 10–50 parts by weight per 100 parts by weight of said fine particles of the n-type metal oxide semiconductor.

9. A recording medium according to claim 1, wherein prior to application, said fine particles are subjected to a resistivity-lowering treatment with a metal halide selected from the group consisting of stannous halides and antimony trihalides.

10. A recording medium according to claim 1, wherein said conductive layer further includes a filler which is a powder of a white, non-conductive inorganic material dispersed in said binder.

11. A recording medium according to claim 1, wherein said dielectric layer is formed from an organic polymer.

12. A recording medium according to claim 11, wherein said dielectric layer further includes a filler which is a powder of a white, non-conductive inorganic material dispersed in said organic polymer.

13. A recording medium according to claim 1, wherein the outer surface of said conductive layer is microscopically rugged and has irregularities whose height or depth is smaller than 5 $\mu m$.

14. A recording medium according to claim 1, wherein the surface resistivity of said conductive layer is $10^7\ \Omega$.

* * * * *